US008923857B2

United States Patent
Kazmi (10) Patent No.: US 8,923,857 B2
(45) Date of Patent: Dec. 30, 2014

(54) METHOD OF FREQUENCY SEARCH (75) Inventor: Muhammad Kazmi, Bromma (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 423 days.

(21) Appl. No.: 13/265,069

(22) PCT Filed: Apr. 20, 2009

(86) PCT No.: PCT/SE2009/050398
§ 371 (c)(1),
(2), (4) Date: Oct. 18, 2011

(87) PCT Pub. No.: WO2010/123416
PCT Pub. Date: Oct. 28, 2010

(65) Prior Publication Data
US 2012/0034917 A1 Feb. 9, 2012

(51) Int. Cl.
H04W 4/00 (2009.01)
H04W 48/16 (2009.01)
H04W 4/02 (2009.01)
H04W 64/00 (2009.01)

(52) U.S. Cl.
CPC ............... *H04W 48/16* (2013.01); *H04W 4/02* (2013.01); *H04W 64/006* (2013.01)
USPC ........ 455/434; 455/435.3; 455/512; 455/513; 455/515; 370/331; 370/338

(58) Field of Classification Search
USPC ............. 455/434, 436, 437, 574, 450–452.2, 455/435.1–444, 512–513; 370/328, 370/331–338; 709/226, 230
See application file for complete search history.

(56) References Cited

U.S. PATENT DOCUMENTS

| 5,471,660 | A  | * | 11/1995 | Masaki ..................... 455/161.2 |
| 5,710,973 | A  | * | 1/1998  | Yamada et al. ............... 455/434 |
| 6,397,064 | B1 | * | 5/2002  | Bridges et al. ............. 455/432.3 |
| 6,615,043 | B1 | * | 9/2003  | van de Berg .................. 455/434 |
| 6,810,251 | B2 | * | 10/2004 | Hassan et al. ................. 455/434 |
| 7,096,016 | B2 | * | 8/2006  | Hasegawa ..................... 455/434 |
| 8,107,955 | B2 | * | 1/2012  | Islam et al. ................... 455/434 |
| 2002/0082010 | A1 | * | 6/2002 | Koorapaty et al. ........... 455/434 |
| 2007/0041344 | A1 | * | 2/2007 | Yaqub et al. .................. 370/331 |
| 2007/0091847 | A1 |   | 4/2007 | Lee |
| 2009/0258645 | A1 | * | 10/2009 | Ramkull et al. .............. 455/434 |

FOREIGN PATENT DOCUMENTS

DE 100 37 474 A1 2/2002

* cited by examiner

*Primary Examiner* — Sharad Rampuria (57) ABSTRACT

In a User Equipment, frequency search is performed using the physical location (e.g. GPS position) and using information about the allocation of frequency bands and the radio access technologies used in these bands in different regions or countries. Hereby, frequency searching can be reduced to those bands and to the corresponding radio access technologies which are used in a current physical location. In order to ensure that UE is configured with the latest and most relevant regional frequency information, regional frequency information is transmitted to the UE over the air interface. In addition, information related to user's travel itinerary and user's travel history can be taken into account. By only frequency searching relevant frequency bands for the radio access technologies used in these bands battery power consumption can be reduced and frequency search speed can be improved.

35 Claims, 3 Drawing Sheets

METHOD OF FREQUENCY SEARCH

TECHNICAL FIELD

The present invention relates to a method and a device for frequency search in a cellular radio system.

BACKGROUND

New frequency bands for different technologies are continuously being standardized. Various internal and regional regulatory organizations and standardization bodies are also putting considerable effort in introducing these bands to be used universally or at least in large part of the world to facilitate roaming, simplify device implementation and cost reduction. Nonetheless, the use of regional or country specific bands would still be inevitable. There is also an increasing demand and use of multi-mode user Equipments (UEs), which consist of multiple Radio Access Technology (RAT) and multiple bands per RAT. The UE typically constantly searches for all supported bands especially when roaming or when loosing coverage. This has the negative impact of draining UE power, increasing the average search delay and requiring UE hardware design to cater for worst case scenario increasing cost and implementation complexity.

Below various concepts and technological aspects relating to multi-mode UEs are outlined.

Frequency Bands and Channel Arrangement Principles
Standardized Frequency Bands in 3GPP Below a list of frequency bands presently specified for different technologies: Global System for Mobile Communication (GSM), Universal Mobile Telecommunications System (UMTS) Terrestrial Radio Access Network (UTRAN) Frequency Division Duplex (FDD) and Evolved Universal Mobile Telecommunications System Terrestrial Radio Access Network (E-UTRAN).

GSM Bands

The GSM bands are specified in Third Generation Partnership Project (3GPP) specification No. TS 45.005, "Radio Transmission and Reception". The same specification provides a complete set of minimum radio requirements for GSM mobile terminal and the base stations. These requirements are used by the manufacturers to build products.

i) T-GSM 380 band:
ii) T-GSM 410 band:
iii) GSM 450 Band:
iv) GSM 480 Band;
v) GSM 710 Band:
vi) GSM 750 Band:
vii) T-GSM 810 Band:
viii) GSM 850 Band:
ix) Standard or primary GSM 900 Band, P-GSM:
x) Extended GSM 900 Band, E-GSM (includes Standard GSM 900 band):
xi) Railways GSM 900 Band, R-GSM (includes Standard and Extended GSM 900 Band);
xii) T-GSM 900 Band;
xiii) DCS 1 800 Band:
xiv) PCS 1 900 Band:

UTRA FDD Bands

All UTRA FDD (Wideband code division multiple access, WCDMA) frequency bands are specified in 3GPP specifications Nos. TS 25.101 and TS 25.104. The same set of specifications provides a complete set of UTRA FDD minimum radio requirements for mobile terminal and the base stations. These requirements are used by the manufacturers to build products.

TABLE 1

UTRA FDD frequency bands

| Operating Band | UL Frequencies UE transmit, Node B receive | DL frequencies UE receive, Node B transmit |
|---|---|---|
| I | 1920-1980 MHz | 2110-2170 MHz |
| II | 1850-1910 MHz | 1930-1990 MHz |
| III | 1710-1785 MHz | 1805-1880 MHz |
| IV | 1710-1755 MHz | 2110-2155 MHz |
| V | 824-849 MHz | 869-894 MHz |
| VI | 830-840 MHz | 875-885 MHz |
| VII | 2500-2570 MHz | 2620-2690 MHz |
| VIII | 880-915 MHz | 925-960 MHz |
| IX | 1749.9-1784.9 MHz | 1844.9-1879.9 MHz |
| X | 1710-1770 MHz | 2110-2170 MHz |
| XI | 1427.9-1452.9 MHz | 1475.9-1500.9 MHz |
| XII | 698-716 MHz | 728-746 MHz |
| XIII | 777-787 MHz | 746-756 MHz |
| XIV | 788-798 MHz | 758-768 MHz |

E-UTRA Bands

All E-UTRA (FDD and Time Division Duplex, TDD) frequency bands are specified in 3GPP specifications Nos. TS 36.101 and TS 36.104. The same set of specifications provides a complete set of E-UTRA (FDD and TDD) minimum radio requirements for mobile terminal and the base stations. These requirements are used by the manufacturers to build E-UTRA products.

As shown in table 2, presently there are 25 E-UTRA bands and about 5 additional are being standardized. In the next few years they are expected to approach in the order of 50 bands as new spectrum is being freed. Additional spectrum would especially be required to introduce advanced E-UTRAN or the so-called Long Term Evolution (LTE) advanced. Compared to the legacy UEs, an E-UTRA or advanced E-UTRA UE is likely to support more bands to ensure universal operation. This will require that a typical E-UTRA UE on the average has to scan or search more frequencies than the legacy UEs.

TABLE 2

E-UTRA frequency bands

| E-UTRA Band | Uplink (UL) eNode B receive UE transmit $F_{UL\_low}$-$F_{UL\_high}$ | Downlink (DL) eNode B transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |

TABLE 2-continued

E-UTRA frequency bands

| E-UTRA Band | Uplink (UL) eNode B receive UE transmit $F_{UL\_low}$-$F_{UL\_high}$ | Downlink (DL) eNode B transmit UE receive $F_{DL\_low}$-$F_{DL\_high}$ | Duplex Mode |
|---|---|---|---|
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1452.9 MHz | 1475.9 MHz-1500.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| ... | | | |
| 17 | 704 MHz-716 MHz | 734 MHz-746 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |

Observation about Frequency Bands
Band Applicability: Single Versus Multiple Technologies Some of these bands can be used for all or at least several technologies whereas some of them are limited to either fewer or only to one technology. For instance GSM band I (450 MHz) is not used for UTRAN or E-UTRAN. On the other hand GSM bands extended 800 (band V), 1800 (band VII) and 1900 (band VIII) can also be used by UTRAN (bands VIII, band III and band II) and E-UTRAN (bands 8, band 3 and band 2) respectively.

Regional Versus Universal Bands

3GPP specifications specify the channel arrangement, signaling and requirements for different bands, which can potentially be used in different countries or regions. This allows the mobile terminal and network manufacturers to built products according to the need and market demands in different parts of the world.

However it is up to each regional or national regulatory body to decide the bands to be used and the applicable technologies in their respective region or country. Since a band can be used for more than one technology, the band can potentially be split for different technologies. This split can vary from one country to another. For instance the UTRAN FDD band I and E-UTRAN band 1 is considered to be universal as it is widely available and allocated in large number of countries across the globe e.g. in Europe, Asia and Australia. However it can also be shared among different technologies and the actual split can vary from one country to another. For instance band 1, which comprises of 60 MHz in each direction, is presently split in Japan as follows:

First 20 MHz is allocated to one operator and is used for cdma2000 technologies
Central 20 MHz is allocated to another operator and is used for UTRAN FDD
Lateral 20 MHz is allocated to yet another operator and is used for UTRAN FDD This means it is of no use for a terminal operating in Japan to scan the entire UMTS FDD band I (i.e. all 276 possible raster positions).

Similarly UMTS FDD bands XII-XIV and the corresponding E-UTRA FDD bands 12-14 are only currently used in US. Furthermore, the entire band 12 and 13 are presently allocated to different operators.

Some of the bands are also purely regional as they are applicable or used solely in certain countries or group of countries or even in specific regions within a country.

An overview of regional organization responsible for allocating frequencies for different technologies within their respective region or country is provided below.

Regional Frequency Allocation

Above an overview of frequency bands specified in 3GPP standard is provided. This allows cellular network manufacturers to build products. However, as described above it is entirely up to the regional or even country wide regulatory or relevant authority to decide whether certain frequency band is allowed or not in their jurisdiction.

In USA, the Federal Communications Commissions (FCC) is responsible for attributing licenses for various Wireless Communications Service (WCS) including fixed, mobile, radiolocation or satellite services.

Similarly in Europe, Electronic Communications Committee (ECC), which is part of European conference of postal and telecommunications administrations (CEPT), is responsible for radio communications and telecommunications matters. More specifically European Radiocommunications Office (ERO) supports ECC in developing and maintaining the frequency allocation for CEPT member countries. As of today there are 48 CEPT member countries. Each member country has its own frequency allocation. However, the ERO allocation table is used as the basis for developing national frequency allocation. Similar regional organizations are active in other parts of the world for allocating frequencies in their region for different technologies.

In summary the actual bands and frequencies used in a particular region or a country is regulatory by the regional or country wide organizations responsible for frequency allocation in their respective regions.

Reallocation and Swapping of Bands

As the demand for particular a technology grows new frequency bands are standardized. There is also an increasing trend towards freeing spectrum used by conventional technologies and reallocating it to more modern technologies.

For instance frequency bands used for older technologies like advanced mobile phone system (AMPS) in USA and PDC in Japan are being standardized for WCDMA and LTE. One recent example is that of Japanese 800 MHz band (i.e. 815-830 MHz in UL), which is presently and exclusively used for cdma2000. But very recently it is being standardized for LTE, see RP-080884, "Extended UMTS/LTE 800" Approved work Item. This means multi-RAT UE supporting both cdma2000 and LTE and operating in this band (800 MHz) will have to search for both cdma2000 and LTE systems.

Multimode User Equipments

A multimode UE is a UE supporting more than one band per radio access technology (multi-band) and/or supporting more than one radio access technology (multi-RAT). This is further elaborated below:

Multi-Band UE

Most of the UE today support multiple bands even for the same technology. This is because either the service provider may own carriers in different bands and would like to make efficient use of carriers by performing load balancing on different carriers. Secondly multi-band UE enables roaming since many bands are regional. A well known example is that of multi-band GSM terminal with 800/900/1800/1900 bands ensuring almost universal operation (i.e. in US, Europe, Asia and other regions).

Multi-RAT User Equipments

In the past legacy UE typically supported one RAT e.g. only GSM between one to 3 bands. Presently multi-mode UE with two RATs e.g. GSM and WCDMA are quite common. In near future multimode UE implemented with 3 or more RAT will probably also be common.

According to E-UTRAN standard, see 3GPP TS 36.133, "Evolved Universal Terrestrial Radio Access (E UTRA); Requirements for support of radio resource management", a multi-RAT UE may support any combination of one or more of the following technologies while fulfilling the inter-working requirements (e.g. cell reselection and handovers between RATs):

E-UTRAN FDD
E-UTRAN TDD
UTRAN FDD (WCDMA)
UTRAN TDD
GSM
cdma2000 1xRTT
HRPD.

For example a UE with the following combination of RATs may exist in the future:

I E-UTRAN FDD, WCDMA, GSM
II E-UTRAN TDD, E-UTRAN TDD, GSM
III E-UTRAN FDD, E-UTRAN TDD, WCDMA, GSM
IV E-UTRAN FDD, E-UTRAN TDD, UTRAN TDD
V E-UTRAN FDD, cdma2000 1xRTT, HRPD
VI E-UTRAN FDD, E-UTRAN TDD, cdma2000 1xRTT, HRPD This is one example and several other cases may also exist. An increase in the number of RAT and bands per RAT results in that a UE will have to search for more frequencies increasing UE processing and power consumption.

Below some additional concepts are described namely: channel raster and channel numbering.

Channel Raster

In order to simplify the frequency search or the so-called initial cell search the center frequency of a radio channel is specified to be an integral multiple of well define, generally a fixed number, called channel raster. This enables a UE to tune its local oscillator only at one of the raster points assuming it to be the center frequency of the channel being searched.

The channel raster in WCDMA is 200 KHz but for certain channels and bands it is also 100 KHz. In LTE E the channel raster for all channels (i.e. all bandwidths) is 100 KHz. The channel raster directly impacts the channel numbering, which is described in the next section.

There is a trade-off between shorter and larger channel raster. If raster is too small then UE has to consider more hypotheses regarding the location of the center frequency of a channel when performing the frequency search. A guard band between adjacent channels within the same or between different operators may have to be introduced to reduce the adjacent channel interference or the effect of out of band emissions. Therefore too large raster would lead to wastage of frequency band due to the coarser resolution of guard bands.

Channel Numbering

A channel number is designated by an absolute radio frequency number. In GSM, WCDMA and E-UTRAN the channel numbers are called as Absolute Radio Frequency Channel Number (ARFCN), UTRA Absolute Radio Frequency Channel Number (UARFCN) and E-UTRA Absolute Radio Frequency Channel Number (EARFCN) respectively. In FDD systems separate channel numbers are specified for uplink and downlink. In TDD there is only one channel number since the same frequency is used in both directions.

The channel number for each band can be derived from the expressions and mapping tables defined in the relevant 3GPP specifications set out above. For initial frequency searching the UE has to search at all possible raster frequencies. However, for the UEs camped on the cell, the network signals the absolute channel number(s) for performing measurements, mobility decisions such as cell reselection or commanding handover to certain cell belonging to certain frequency channel of the same or of different RAT etc.

Cell Search Procedure

In most technologies like in GSM, UTRA or E-UTRA the UE searches cells in hierarchical manner and is called as hierarchical cell search procedure. This means UE typically acquires frequency synchronization, cell frame timing and cell physical identity in tandem. These concepts are discussed in the following sections.

Frequency Search or Band Scanning

When the UE is powered on, it first searches the list of all possible frequencies (or channels) in a frequency band. A multi-mode UE does this for all bands for RAT it supports unless explicitly forbidden.

The goal is to find in a particular band, the most suitable frequency channels in use in that region. In the next phase the UE proceeds with remaining task or more specifically acquires the cell timing and cell identity (ID) of neighbor cells, which are operated on the same frequency channel found in the first step. This is further described below. The process of searching frequency channel is often called as the initial cell search. However, band scanning and frequency search are also commonly used terms in literature. Here the term 'frequency search' is used.

To understand the complexity involved in frequency search procedure it can be helpful to for example consider UTRA FDD band I or E-UTRA band 1 (uplink: 1920-1980 MHz and downlink: 2110-2170 MHz).

Assume a UTRA FDD case where normally 12 bi-directional channels can be supported since each channel is of 5 MHz. Note that channels can also partly overlap in which case one or more extra channel might be possible to squeeze in. Alternatively if a guard band is used then fewer than 12 channels would be used. Considering 200 KHz channel raster in UTRA FDD, the uplink UARFCN and down UARFNC ranges, which are [9612, 9888] and [10562, 10838] respectively, can be derived from 3GPP specification TS 25.101. This means that a UE has to scan 276 possible channels when scanning UTRA FDD band I. Consider next the E-UTRA FDD case where channel bandwidth is variable ranging from 1.4 MHz to 20 MHz. The combination of relatively shorter channel raster and the variable channel bandwidth will cause a dramatic increase in the number of hypotheses an LTE UE will need to consider during frequency search or the so-called band scanning. To slightly facilitate the cell search procedure in LTE all synchronization sequences and physical broadcast signaling are sent over the central 1.4 MHz regardless of the channel bandwidth in use. At a later stage after the cell synchronization has been fully sought, the UE obtains the information about the actual channel bandwidth used in a cell by reading the physical broadcast channel (PBCH). Since E-UTRA FDD employs channel raster of 100 KHz, therefore for E-UTRA FDD band 1 the UE has to scan at least twice as many or more specifically 600 possible channels as specified in 3GPP specification TS 36.101.

This means that the complexity of the frequency search increases proportionally with the increase in the number of bands to scan. In other words the frequency search delay will linearly increase with the number of frequencies searched. As can be understood the complexity due to searching becomes manifold in case of a multi-mode terminal, which has to scan multiple bands for each supported RAT. Furthermore, the task of band/RAT scanning considerably drains UE battery especially since this is mostly done in idle mode.

The impact is significant when roaming to a visited network as described below or when a UE looses coverage of particular band or RAT.

The 3GPP standard does not specify any performance requirements for frequency search or the so-called initial cell search. Instead requirements are specified only for neighbor cell search discussed below. Similarly neither detailed frequency search nor neighbor cell search procedures are specified in the standard. Instead frequency arrangement and channel structure e.g. channel raster, synchronization sequences etc are designed to assist these procedures.

The identities of home public land mobile network (HPLMN) and the corresponding access technology with their priority are provided on the SIM card, see 3GPP specifications Nos. TS 23.122, "Technical Specification Group Core Network and Terminals; Non-Access-Stratum (NAS) functions related to Mobile Station (MS) in idle mode" and TS 31.102, "Technical Specification Group Core Network and Terminals; Characteristics of the Universal Subscriber Identity Module (USIM) application".

A PLMN is a set of an access network, core network and other necessary mobile network elements or entities forming a complete mobile network. Similarly the subscriber can manually select and set the priority order of PLMN and the corresponding access technology or RAT. Nonetheless UE needs to initially scan the frequency bands in order to ensure that it camps on the cell of the desired PLMN, e.g. one prioritized by operator where location area or tracking area update can be successfully performed.

Frequency Search Performance Results

As stated above there are no standardized performance requirements for frequency search. Here a summary of WCDMA and LIE frequency search performance results for band I based on some earlier analyses is described. According to the analysis provided in A. Nielsen and S. Korpela, "WCDMA Initial Cell Search" Proc. IEEE VTC 2000, the searching of entire UTRA FDD band I (all possible 276 channels) even in relatively strong radio conditions (e.g. SCH SINR=−14 dB) requires on the average 10 seconds. Note that UTRA FDD cell search needs to work down to synchronization channel (SCH) SINR=−20 dB. Around this lowest level the band I search takes an exorbitant average time of about 60 seconds.

In similar but more recent studies presented in 3GPP R4-072076, "LTE PLMN band scan strategy: performance discussion" NXP, Philips it has been shown that the UTRA FDD band I search can be in the order of 7 seconds in the worst case. In the same contribution it has been shown that even in the most favorable conditions the E-UTRA FDD band 1 search can be in the order of 70 seconds and in the worst case can be between 100-300 seconds.

Cell Timing and Cell ID Acquisition

During the frequency searching a UE generally also detects the timing of the strongest cell. This however depends upon the specific algorithm used for frequency search. For instance a UE typically performs correlation over the synchronization sequences while assuming a certain center frequency.

In any case after acquiring frequency synchronization the UE continues performing the neighbor cell search. It therefore continuously attempts to find the cell timing and physical ID of the cells operating on the acquired carrier frequency. Once a UE is camped on the strongest cell the broadcast information is downloaded and the location area update in UMTS or tracking area update in LTE is carried out. If authentication fails the UE attempts to connect to another suitable cell or to a cell of another allowed PLMN.

The 3GPP standard specifies the neighbor cell search requirements, which are defined in terms of time required to acquire cell ID (assuming carrier frequency is known) under certain side conditions e.g. under certain lowest synchronization channel (SCH) received or SCH signal to interference plus noise ration (SINR) levels. The maximum intra-frequency cell search delay requirements are 800 ms for both WCDMA, see 3GPP TS 25.133, "Requirements for support of radio resource management (FDD)" and E-UTRA, see 3GPP TS 36.133, "Evolved Universal Terrestrial Radio Access (E UTRA); Requirements for support of radio resource management". The inter-frequency requirements scales with measurement gap density.

Impact of Roaming on Cell Search

During roaming a UE needs to scan all possible channels within all its supported bands. A home operator typically has a roaming agreement with multiple operators. Therefore, when being out of the home network a UE typically has a choice to camp on more than one visited network (i.e. visited PLMN). This further intensifies frequency search when the currently camped on cell becomes weaker. Similar behavior is observed when a UE looses coverage of its home network or the currently used band or RAT. That is why it can be noticed that a UE battery typically drains more quickly while roaming.

Satellite Based Mobile Positioning Methods

The popularity of a service allowing the determination of user positioning via a dedicated handheld device or an integrated mobile phone is on the rise. Furthermore, for safety purposes, mobile positioning is gradually becoming mandatory in several parts of the world. For instance, in the US the FCC mandate for Phase II E-911 services (emergency call public safety systems) in the near future will require that all mobile devices support positioning. Thus, in upcoming years most mobile devices are likely to support some sort of positioning mechanism.

Several methods are standardized and can be used for positioning (i.e. for determining mobile user position) in mobile communication. Some well known examples are: satellite based positioning, fingerprinting, time of arrival based method, etc.

Global Navigation Satellite System (GNSS) is a standard generic term for satellite navigation systems that enable subscriber to locate their position and acquire other relevant navigational information.

The global positioning system (GPS) and the European Galileo positioning system are well known examples of GNSS. Other potential systems, which are either proposed or those being developed are Russian GlObal Navigation Satellite System (GLONASS), Chinese COMPASS and Indian Regional Navigational Satellite System (IRNSS).

However, only GPS is currently in operation for more than a decade. The GPS comprises of a constellation of 24 to 32 medium earth orbit (MEQ) satellites revolving around the earth. They transmit pilot signals and other broadcast information, which are received and processed by the GPS receivers for determining geographical position. Signals from certain number of satellites (e.g. 5 or more) should be received in order for the GPS receiver to accurately location the geographical position of the user. Of course more number of visible satellites would further enhance the accuracy.

The assisted GNSS (A-GNSS) is a generic term used for any satellite based positioning method adapted for determining the position and other relevant information such as velocity of a mobile terminal.

The assisted GPS (A-GPS) is tailored to work with a user terminal (UE) enabling the UE subscribers to relatively accurately determine their location, time, and even velocity (including direction) in an open area environment provided sufficient number of GPS satellites are visible. A-GPS is standardized for UMTS, see 3GPP TS 25.171, "Requirements for support of Assisted Global Positioning System (A-GPS); Frequency Division Duplex (FDD)". Similar work is underway for LTE, see RP-080995, "Positioning Support for LTE" Approved work Item.

The assisted A-GNSS or A-GPS requires that the cellular network (e.g. base station or radio network controller) provides data at least initially to assist an A-GPS capable mobile terminal to improve the measurement accuracy and to reduce the time required in determining mobile position. The assisted data includes reference time, visible satellite list, satellite signal Doppler, code phase, Doppler and code phase search windows, see 3GPP TS 25.171, "Requirements for support of Assisted Global Positioning System (A-GPS); Frequency Division Duplex (FDD)". This information is obtained by a GPS receiver located at the serving base station, which can detect the navigational satellites more accurately. This data can be valid for a few minutes (e.g., less than 5 minutes) or longer depending on the code phase and Doppler search window size that can be accommodated by the UE.

Note that without network assisted data the UE can still determine its position. However in this case the accuracy of the position will be less accurate in some scenarios for example when fewer satellites are visible or when the signals received from the satellites are weak. The acquisition of the assisted data requires UE to first synchronize to the network i.e. camped on a cell. This means prior to camping on a cell the GPS based initial position of the UE without valid or up-to-date assisted data may incorporate a large error when received satellite signal(s) is weak. For instance the error in the position can be in order to hundreds of meters to 1 or 2 kilometers.

The A-GPS service evidently involves subscription charges, which can be considerable. Thus all GPS enabled cell phones may not use assisted GPS. Rather they can rely on the stand standalone non-assisted GPS, which is slower and relatively less accurate when satellite signals are weak, but is also free of charges. Indeed its performance is quite similar to that of a normal GPS receiver. Furthermore, in some implementation in the absence of the valid assisted data, an A-GPS receiver may also have an ability of falling back to a baseline non-assisted GPS receiver. For instance when UE is unable to detect a cell, such an A-GPS receiver may still be able to determine the subscriber position.

As is described above in existing solutions a UE when powered on performs frequency synchronization by making use of the stored information related to the last carrier frequencies used. The UE may also start searching frequencies which are used in the home network. A problem with such solutions is that the frequency bands and the carrier frequencies used in the visited network may be entirely different than those used in the home network or in the recently accessed network. The result is that in order to camp on to the appropriate carrier frequency, on the average, a conventional scheme will lead to a long frequency acquisition time. Repeated and long frequency synchronization time results in an increased UE power consumption and a shortened UE standby time.

Furthermore, the coverage of newly introduced technology (e.g. LTE) generally expands gradually. Therefore during considerable period of the network expansion phase the coverage is limited to certain parts of a country or a region. Initially the coverage will be patchy but will still be generally continuous in a given local area. Otherwise the network under deployment may not be practically usable by early subscribers. For instance an operator may initially cover major urban localities with this network. Subscribers moving in and out of this limited or local coverage areas or those residing at the border area will often loose coverage and frequently cause their UE (with this RAT capability) to search for the same RAT. However, the UE power can be saved and other existing RATs can be searched relatively quickly provided UE avoids searching those RATs, which are not deployed at the current location of the UE. A similar approach also applies for a newly introduced frequency band of an existing technology e.g. deploying WCDMA over a newly allocated band. The introduction of new band requires the upgrading of various parts of the network infrastructure and in some cases also requires the re-planning of the legacy network e.g. the co-sited deployment of 800 MHz and 2.6 GHz bands, which have very large difference in propagation loss. Thus coverage of new band may gradually expand and would impact UE frequency search performance and UE battery life.

An operator may also choose to deploy different technologies in different regions according to the demand of local subscribers and expected revenue returns. Assume only WCDMA is deployed in some very sparsely populated rural regions whereas both WCDMA and LTE are accessible in all urban and sub-urban areas. Presently, a typical UE supports only two RATs. But in near future the introduction of addition technologies (GSM, WCDMA, UTRA TDD, LTE FDD, LTE TDD, cdma2000 technologies) and large number of bands for each technology will significantly increase the demand of multi-mode UE (multi-RAT and multi-band per RAT). However, still only sub-set of combinations of RAT and bands are likely to be used by an operator in a particular region or country. Since in several cases the same band can be used for multiple RATs, therefore a particular operator, which has limited amount of spectrum, may be obliged to prioritize certain bands for certain RAT.

Radio Requirements

The radio requirements are specified for both UE and the BS and broadly categorize into transmitter and receiver requirements. The radio requirements are specified for different technologies (GSM, UTRA FDD and E-UTRA) for UE and BS in the following specifications:
  i. 3GPP TS 45.005, "Radio Transmission and Reception"
  ii. 3GPP TS 25.101, "User Equipment (UE) radio transmission and reception (FDD)".
  iii. 3GPP TS 25.104, "Base station (BS) radio transmission and reception (FDD)".
  iv. 3GPP TS 36.101, "Evolved Universal Terrestrial Radio Access (E-UTRA) and Evolved Universal Terrestrial Radio Access (E-UTRAN); User Equipment (UE) radio transmission and reception"
  v. 3GPP TS 36.104, "Evolved Universal Terrestrial Radio Access (E-UTRA) and Evolved Universal Terrestrial Radio Access (E-UTRAN); Base station (BS) radio transmission and reception"

The radio requirements are briefly elaborated below:

Although a wireless device typically operates in a well defined portion of the frequency band, emissions outside its operating bandwidth and also outside its operating band are unavoidable. Therefore, UEs as well as base stations have to fulfill a specified set of out of band (OOB) emission requirements, which are important transmitter requirements. The objective of OOB emission requirements is to limit the interference caused by transmitters in the User Equipment and radio base station outside their respective operating bandwidths to the adjacent carriers or bands. In fact, all wireless communication standards (e.g. GSM, UTRAN, E-UTRAN, WLAN etc), clearly specify the OOB emission requirements to limit or at least minimize the unwanted emissions. They are primarily approved and set by the national and international regulatory bodies e.g. ITU-R, FCC, ARIB, ETSI etc.

The major OOB emission requirements, which are typically specified by the standards bodies and eventually enforced by the regulators in different countries and regions for both UE and the base stations comprise of:
  Adjacent Channel Leakage Ratio (ACLR)
  Spectrum Emission Mask (SEM)
  Spurious emissions
  Additional spurious emissions or additional maximum power reduction
  In-band unwanted emissions The specific definition and the specified level of these requirements can vary from one system to another. Typically these requirements ensure that the emission levels outside an operating bandwidth or band in some cases remain several tens of dB below compared to the wanted signal in the operating bandwidth. Although OOB emission level tends to decay dramatically further away from an operating band but they are not completely eliminated at least in the adjacent carrier frequencies.

Since emissions are unavoidable therefore both the User equipment and radio base station should be capable of receiving the desired or the so-called wanted signal under the presence of reasonable interference due to emissions from other devices operating in adjacent carriers or bands. Hence a large number of radio receiver requirements are specified and several of them are also primarily set by the regional or international regulatory bodies. The objective of the radio receiver requirements is to ensure that the devices are able to adequately receive the desired signal in the presence of allowed out of band emissions from the other devices. Some examples of radio receiver requirements are:
  Adjacent Channel Selectivity (ACS)
  Blocking Characteristics There are few important observations about the radio requirements. Firstly different technologies may have different requirements. For instance in E-UTRAN the UE ACLR is 30 dB for an adjacent E-UTRA carrier. However, E-UTRA UE ACLR for an adjacent UTRA carrier is 3 dB tighter i.e. 33 dB. In UTRA FDD (WCDMA) the UE ACLR is 33 dB.

Secondly, the same technology may have different requirement level in different region. This particularly depends upon the type and nature of the technologies co-existing in a particular region. For example, the E-UTRA FDD operation of 10 MHz bandwidth in band 13 requires very stringent additional maximum power reduction requirement. However, the UTRA FDD, which uses only 5 MHz, operating in band 13 would be required to fulfill relatively modest maximum power reduction requirement.

Furthermore, for the same frequency band the radio requirements may differ from one region to another. This is also due to the type and nature of the technologies co-existing in a particular region.

In the patent application in EP 1739991 A1 a User Equipment (UE) determines its location via GPS and scans a selected set of frequencies rather than the entire band used in that particular area.

The solution described in EP 1739991 A1 is however only feasible if there are very few limited bands and RATs and the frequency information remains stable over longer time. However, over the past few years, the number of possible frequency bands and RATs has grown with rapid pace. As described above, several combinations of multimode UEs can be envisaged in the market. It is therefore not feasible to pre-code the complete set of frequency information of all supported RAT pertaining to all possible regions of the world. Secondly, the frequency information may change from one region to another. Though the modification may not be very frequent but is most relevant for the subscribers traveling to these destinations where the change has occurred. Thus, if there is any change in the frequency information, it may not be feasible to provide the complete set of updated information to all the subscribers. On the other hand it is important that subscribers traveling to such areas or frequent travelers are able to acquire up to date frequency information of these locations ahead of their journey.

Furthermore, EP 1739991 A1 is not concerned with frequency searching at the dedicated mobile networks (e.g. onboard mobile network, railways mobile network, on ships etc). This is because in order to improve the band scanning in these dedicated networks, the signaled information described in EP 1739991 A1 comprising of frequencies and regional coordinates is not sufficient.

Hence, there exist a need for a method and a device that is able to provide improved searching of frequencies in a cellular radio system.

SUMMARY

It is an object of the present invention to provide improved searching of frequencies in a cellular radio system.

This object and others are obtained by the method and system as set out in the appended claims. Thus, by determining the physical location (e.g. GPS position) and using information about the allocation of frequency bands in different regions or countries in a User Equipment, frequency searching can be reduced to those bands which are used in a current physical location. In order to ensure that UE is configured with the latest and most relevant regional frequency information, regional frequency information is transmitted to the UE over the air interface. In addition, information related to user's travel itinerary and user's travel history can be taken into account. By only frequency searching relevant frequency bands battery power consumption can be reduced and frequency search speed can be improved.

In accordance with one embodiment a network node is adapted to signal regional frequency information to a UE in response to the relevant subscriber travel information or its relevant travel historical data. In accordance with another embodiment regional frequency information is programmed into the UE. Based on the regional frequency information the UE performs the frequency search, which is then based on location awareness.

In accordance with one exemplary embodiment, the home network of the UE is adapted to provide the UE with frequency information for all RAT:s used in different visited networks in the world, i.e. in the networks of roaming partners or the updated regional frequency information In accordance with one embodiment, the home network of the UE is adapted to provide the UE with frequency information the relevant regional frequency information whenever network obtains one or more of the following information:
Subscriber travel itinerary
Subscriber travel history e.g. travel routes, frequent destinations etc.

In accordance with one embodiment the information signaled from a node in the network to the UE can comprise a mapping between the geographical location (e.g. GNSS coordinates) and the corresponding frequencies used in a region. Such signaled information can be termed regional frequency information.

In some embodiments depending upon the type or level of travel itinerary information, the time duration over which the regional information is applicable can also be signaled.

The frequency information can comprise the frequency bands and/or channel frequencies within each band used for a given RAT in a particular region.

In one embodiment, while roaming or when a UE turns on after certain off period ($T_{OFF}$) or when UE looses coverage, the UE can use GNSS or A-GNSS to track its geographical location before starting the band scanning or the so-called frequency search. If the tracked geographical location indicates that the UE is not within its home network, the UE is adapted to start searching the most relevant frequencies in the visited network as indicated in the regional frequency information that can be provided by the network.

In another embodiment when the tracked geographical position indicates that the UE is not within its home network, the UE can be adapted to first search the last used frequencies. These frequencies can typically be stored on the Subscriber Identity Module (SIM) card or USIM card or on similar card that contains subscriber related information. If the last used frequencies are not detected by the UE, the UE is adapted to start searching the most relevant frequencies in the visited network as indicated in the network signaled regional frequency information.

Furthermore it can be beneficial to configure a multi-mode UE to concentrate on searching the currently deployed RAT or frequency band(s) of that RAT. In existing solutions a UE is not provided or does not have any geographical information of the region or area where particular frequency band is in use. This means typically it searches for all possible frequency bands of all supported RAT:s even if some of them are not used. This has significant impact on UE power consumption, complexity and overall performance of the cell search in practice.

In one embodiment, the regional frequency information is signaled to the UE to assist frequency searching. In another embodiment regional frequency information is pre-coded in the User Equipment to assist frequency searching in different region.

BRIEF DESCRIPTION OF THE DRAWINGS

The present invention will now be described in more detail by way of non-limiting examples and with reference to the accompanying drawings, in which.

DETAILED DESCRIPTION

Figure 1:
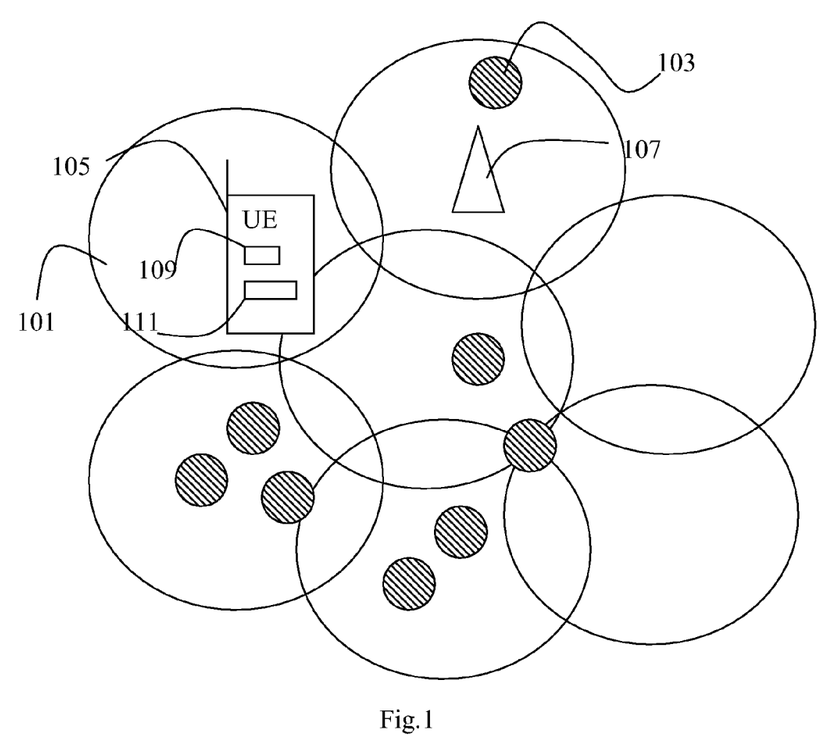
FIG. 1 is a view illustrating a cellular radio system.

In FIG. 1 a view schematically illustrating a cellular radio system 100 is shown. The system in FIG. 1 illustrates an exemplary radio system network comprising multiple radio access technologies. The system depicted in FIG. 1 comprises two different radio access technologies deployed within the same geographical area. It is understood that additional radio access technologies can be deployed along side the two radio access technologies shown in FIG. 1. The different technologies may also be deployed in different frequency bands. To simplify the description FIG. 1 only shows two radio access technologies. The radio access technologies may for example be a GSM system comprising cells 101 and LTE cells 103 deployed certain locations within the GSM network. As the LTE system develops over time the area covered by the LTE system can be supplemented by deployment of additional cells in the system 100.

However, the system and method as described herein is not limited to any particular radio access technologies and the cells 101 and 103 could equally well correspond to GSM WCDMA, LTE, WiMAX a Wireless Local Area Network (WLAN) or any other technology providing radio access. A User Equipment (UE) 105 supporting a number of radio access technologies and or frequency bands can be adapted to frequency search all the radio access technologies frequency bands that it supports to try to find the best way of access when moving around within a geographical area. The system 100 further comprises a node 107 adapted to generate and transmit regional frequency information the UE over an air interface. The node 107 is typically a radio base station adapted to transmit and receive data to/from the user equipment over an air interface. The radio base station can be adapted to itself generate regional frequency information or adapted to receive regional frequency information from another node in the system. The UE can also comprise a module 109 for receiving and processing regional frequency information for use in a method of frequency searching. In addition the UE 105 can comprise a memory module 111 adapted to store pre-coded regional frequency information.

Figure 2:
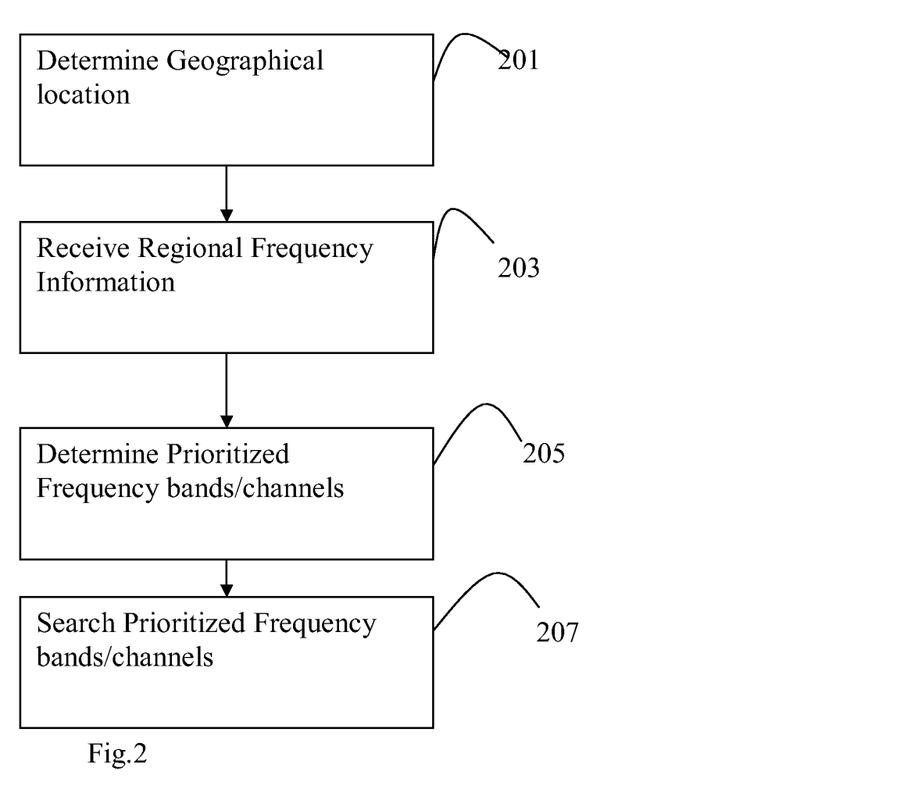
FIG. 2 is a flow chart illustrating frequency search.

In order to provide an efficient frequency search the UE 105 can be adapted to perform the frequency search based on regional frequency information. In FIG. 2 some procedural frequency search steps performed in a UE searching for a suitable channel in one or more suitable cell are depicted.

First, in a step 201, the UE determines the present location. Next, in a step 203, the UE processes received regional frequency information. The regional frequency information can comprise information about frequency bands in different regions in addition the regional frequency information can comprise information about ranges over which the regional frequency information is valid. For example the ranges may include one or more of the following: start time and duration, elevation, height or air pressure, Doppler frequency or UE speed over which the said regional frequency information is valid. Next, in a step 205 the frequency bands and if possible a set of the channels used at the location of the mobile terminal where the said usage of bands or frequencies is determined from the determined geographical location and the regional frequency information. Next, in a step 207 a frequency search is performed using the information derived in step 205. For example the frequency search in step 207 can be performed by prioritizing the searching of frequencies belonging to the frequency bands used at the present location as determined in step 205.

Figure 3:
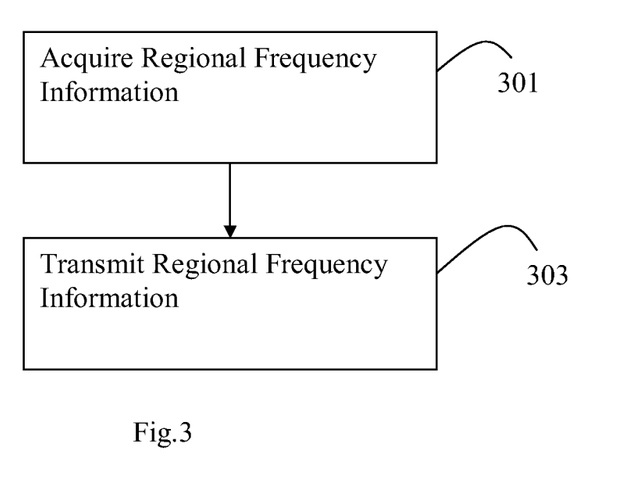
FIG. 3 is a flowchart illustrating steps performed when transmitting regional frequency information.

In FIG. 3 some procedural steps performed in a node 107 in a cellular radio system are depicted. The node can for example be a radio base station. First in a step 301 the Node generates or receives a set of regional frequency information for a particular area. Next, in a step 303, the Node transmits the acquired regional frequency information to a User Equipment 105 for use in the UE when performing a frequency search as described above in conjunction with FIG. 2.

An exemplary use of the method a devices as described above is the case of cdma 2000 and LTE deployed in the same band in different regions. Because the same part of this band will not be used for LTE and cdma2000 in the same geographical region, regional frequency information, in this case band usage for LTE and cdma2000 in different regions, can be conveyed to a UE. Using such regional frequency information the UE can considerably improve the frequency search by concentrating on the relevant part of the band used for the corresponding technology.

Content of Regional Frequency Information:

Below the content of the regional frequency information that can be signaled to the UE or acquired by the UE whenever necessary is described for some exemplary embodiments.

Typically the UE is provided with the frequency information of all RAT:s used in different visited networks in different parts of regions of the world (i.e. in the networks of roaming partners). This is probably the most typical and basic information, which is signaled to the UE or whose access is made available to the UE. The information is typically provided by the home network.

In some embodiments the regional frequency information may comprise information in terms of start time, end time and duration of the validity of the particular frequencies and RATs to be used.

In one embodiment the regional frequency information may comprise information in terms of flight elevation/altitude and the flight cabin pressure as well as the start and end times of the flight. This embodiment is inter alia relevant for a subscriber intended to take a flight. It is assumed that the network is aware of the subscriber's travel plan as will be described below.

In one embodiment the regional frequency information can comprise additional information in terms of user speed, Doppler frequency, rate of change of cells (i.e. handover or cell reselection rates). This embodiment is inter alia relevant for a subscriber intended to travel via train or via bus. Herein it is also assumed that the network is aware of the subscriber's travel plan as will be described below.

In accordance with one embodiment the above regional frequency information is signaled to the UE by the network. However, as described below other means such as prompting the subscriber to obtain the regional frequency information of the destination from the operator's web site may also be used.

The regional frequency information hence typically will comprise frequency bands and may also comprise more detailed information e.g. carrier frequencies used for a particular RAT within a certain band. For example, in Japan presently UMTS band I (2 GHz) is split between cdma2000 (first 20 MHz) and WCDMA (remaining 40 MHz) technologies. As described above, the frequency allocation in different region is specified in the regional or country wide regulator standards and is publically available. However, the allocated frequencies can also be swapped between different technologies. This is because of the introduction of new technologies and the fact that the same operator may decide to use its allocated frequencies for a different technology at some point in time. However such a change occurs on a slow basis and therefore the updated information can be provided to the UEs when there is change in frequency allocation.

More specifically the signaled regional frequency information can comprise of mapping between the geographical location (e.g. GNSS or A-GNSS coordinates) and the corresponding frequencies (frequency band and carriers as stated above) used in a region. Note that the carrier frequency is addressed by its universal number e.g. ARFCN, UARFCN and EARFNC for GSM, UMTS and E-UTRAN respectively.

Alternatively the signaled information can comprise of mapping information between country codes or regional codes and the corresponding frequencies used those regions. Nonetheless this signaled regional frequency information comprises region information where a region is expressed by a country or regional code or by any other suitable geographical information e.g. coordinates such as latitude and longitude of the center of the region and the radius. The geographical information can also comprise of multiple sets of coordinates forming a polygon where the corresponding set of bands/frequencies are used or similar.

The home network in accordance with one embodiment provides the regional frequency information to each UE individually. The network can provide all necessary regional frequency information of its roaming partner to the UE during initial registration process. On receiving the signaled information the UE can store this on its SIM (i.e. for GSM) or USIM (i.e. for UMTS or LTE) card or in a suitable memory location. Alternatively this information can also be pre-stored by the home operator on the SIM or USIM card.

To facilitate frequency searching in the home network especially in case of partial deployment of certain RATs/bands the home network may also signal each UE individually the mapping between RAT/bands used in its own network and the geographical location of their coverage areas.

However, since regional frequency information can change with time, a home operator can update or provide complimentary information to the subscribers via dedicated signaling or via SMS or other UE specific means.

In existing technology each UE reports its RAT and frequency bands capabilities to the network. Therefore the signaled regional frequency information will only be related to the RAT and the frequency bands supported by the UE.

As an example consider a particular multi-mode UE (WCDMA and E-UTRAN FDD) supports only UTRA FDD band I (2 GHz) and UTRA FDD band VII (2.6 GHz) and E-UTRA FDD band 12 (700 range) and E-UTRA FDD band 6 (800 range). Since UTRA FDD bands I and VII are almost universally used therefore regional frequency information for these bands would comprise of large number of country codes or their geographical information (e.g. coordinates, radius etc). In a similar solution it can be sufficient to indicate, 'universal' for UTRA FDD band I. However in some countries like in Japan where presently UTRA FDD band I is not fully used for UTRA FDD i.e. only 40 MHz from 1940 to 1980 MHz for UL and 2130 to 2170 MHz for DL are used for UTRA FDD. Thus in case more detailed information of the band usage is provided then for Japan the signaled UARFCN (frequency numbers) corresponding to 1940 MHz and onwards could be signaled. This will prevent UE (UTRA FDD mode) from searching the first 20 MHz when visiting Japan. On the other hand E-UTRA FDD frequency bands 12 and 6 are used only in US and Japan respectively. Thus UE (E-UTRA FDD mode) preferably should search these bands only when in the country where they are used. Therefore by providing mapping between frequency band and the region where they are currently used, the UE will only search for these bands when visiting these countries. In this way considerable UE power saving can be achieved. Furthermore the searching of the bands actually used in the current network will also be faster.

In some embodiments the regional frequency information or the sub-set of it may the applicable only over certain time duration. In that case the associated time duration e.g. start and end times or start time and the duration associated with the regional frequency information is also signaled.

As described below, the UE can exploit this signaled information to improve the frequency searching especially when in a visited network or when loosing coverage even in the home network.

Since the home operator may also have a partial deployment of certain RATs and bands, therefore it may also provide the frequency information of its own network i.e. mapping between RAT/bands used in the home network and the geographical location of their coverage areas.

Triggering Mechanisms for Configuring Regional Frequency Information

Below exemplary criteria and conditions used to trigger the configuration of the UE with the latest (up to date) and the most relevant regional frequency information are described.

There are two main types of triggering mechanisms:
Network Initiated Mechanisms and Criteria for Configuration
Subscriber Initiated Mechanisms and Criteria for Configuration These are described in more detail below.

Network Initiated Mechanisms and Criteria for Configuration

To work as efficiently as possible the UE preferably should have up to date information when roaming and especially when it is roaming to another country. This is particularly true when a UE roams to a country or to a region with completely or significantly different allocation of the bands compared to those used in its home network.

In one embodiment, the network has means to acquire the information pertaining to the subscriber's travel plan. Based on this acquired information, the network signals the most relevant regional frequency information or the updated frequency information of the destination to the UE ahead of the journey.

One or more of the following criteria are used by the network to signal the regional frequency information to the UE.
Based on subscriber itinerary information
Based on GNSS or A-GNSS destination information
Based on subscriber travel history As described above the home operator may be aware of the subscriber's travel itinerary e.g. via SMS or mobile information service. Thus, in accordance with one embodiment the network configures the UE or provides the UE with regional frequency information of the regions, countries or locations to the subscriber prior to departure. As a result, the UE is updated with the most relevant regional frequency information whenever the operator becomes aware of the subscriber's travel plan e.g. air travel, bus journey or sea voyage. Since the network knows about the concrete subscriber travel plan, it can signal or configure the frequencies used at the final destination and if necessary of the regions traversed by the subscriber during the journey.

In addition the network can also provide the regional frequency information of the frequencies used in an aircraft, on the boat, along the railway tracks or on the major highways. Furthermore, the start time, the duration or the end time over which the regional frequency information should be valid or should be used with priority may also be provided to the UE.

The network can make use of one or more of the following for determining the subscriber's travel itinerary:
Terrestrial travel information e.g. traveling by bus, by train, by sea or by any means that involve mobile related services such as SMS.
Flight information in case of air travel
Based on GNSS or A-GNSS destination information; event triggered configuration A user subscribing to the A-GNSS service (e.g. A-GPS service) or any suitable mobile positioning service can typically use the positioning service to determine its route when driving to a particular destination. The user enters the address of the destination (e.g. street name, town, locality or name of a place etc) either at the start or during the journey. This in turn enables the network to be aware of the user's destination place. In case of long travels such as between the cities, regions or countries it is likely that the user may end up at a destination where the applicable frequencies and RATs are different compared to the present location of the subscriber. Thus, depending upon the destination and the route to be followed by the UE, the network can provide UE the necessary frequency information relevant to the destination and the intended route.

Based on Subscriber Travel History; Periodic or Regular Configuration

In accordance with one embodiment the network is adapted to keep track of the subscriber's travel history. In case a subscriber is identified to be a regular or frequent traveler to certain destination(s) or uses route(s) belonging to a different network (e.g. visited network), where the frequency information is different or is likely to modify, then the network periodically or on regular basis provide the up to date regional frequency information of these destinations, routes and if necessary also of the proximity areas. In this way the UE is configured with the latest frequency information in the background.

The network can identify whether the subscriber is traveling to a particular destination or not by making use of information such as registration area updates, location area updates, tracking area updates, use of A-GNSS service during travel which depicts routes/destinations, registration at visitor location register (VLR) etc. The UE request for the UE location, registration or tracking area updates arrives at the core network. The core network in turn carries out authentication function to check whether the intended UE is allowed to operate in the new or visited registration, location or tracking area. Thus the statistics of the subscriber's location, registration or tracking area updates performed over a certain period of time can be collected and maintained at the core network. This information can in turn be used by the network to send appropriate regional frequency information to the UE.

In case the travel history depicts that the subscriber does not travel to a previous destination or travels very unpredictably, then the network may either reduce the periodicity or stop configuring the UE with the frequency information pertaining to these earlier destinations.

In case the travel history reveals random behavior of the subscriber in terms of the visited locations and the followed route, then if necessary the network may periodically or occasionally configure the UE with more comprehensive information of vast areas, which have been visited in the recent past or are likely to be visited.

Subscriber Initiated Mechanisms and Criteria for Configuration

In embodiments falling under this type of triggering mechanism, the UE is configured or updated with the relevant regional frequency information in response to subscriber input regarding its travel plan, destinations, routes etc.

In accordance with one embodiment an application program is provided. The program can be provided with computer program segments used to enable a subscriber to enter its travel plan such as destination, arrival time, length of stay etc e.g. by clicking on the map. One objective is to indicate the subscriber that this information will improve the performance of its UE. The same application program may be used for other purposes such as enabling the subscriber to obtain recommended places at the destination e.g. hotels, entertainment tips.

In response to that the subscriber's feedback indicates that the UE is to travel to a country or a region with partially or significantly different use of the frequencies or RAT, the UE is configured with the relevant frequency information. This can be done in some different ways as described below.

In one embodiment the network is adapted to configure the UE with the relevant regional frequency information pertaining to the subscriber's destination, routes etc. Alternatively, in another embodiment the subscriber is instructed to download the latest information corresponding to the destinations and travel routes from the web site of the service provider to optimize the performance.

Frequency Searching Based on Regional Geographical and Frequency Information

Below it is described how a UE can utilize geographical knowledge and frequency information to improve frequency search process thereby reducing frequency search delay and reducing power consumption.

In one embodiment an autonomous frequency searching without using signaled information is performed. Above, various triggering mechanisms for configuring the regional frequency information for a UE enabling an improved frequency search are described. However even without this information a UE can make use of its geographical location and some standardization frequency band knowledge to improve frequency search.

Assuming that UE is equipped with GNSS or A-GNSS receiver to track its location; GPS or A-GPS receiver are specific examples, the standardized frequency information can be obtained from various standards and regional regulatory bodies as described above.

The UE can be set to maintain a mapping table between the allocated frequency bands used for different RAT supported by this UE and the corresponding regions/countries. In such an embodiment the network does not signal regional frequency information to the UE therefore such a table needs to be pre-coded or pre-defined in the mobile terminal.

There are different alternatives of implementing and maintaining such a pre-coded mapping table. One possibility is that the subscribing operator stores it on the SIM (or USIM) card or on a suitable memory location. Another more flexible approach is that mobile manufacturer provides this information via an application program. The UE typically uses stored information on the SIM (or USIM) card for initiating the frequency search. Therefore the information (i.e. mapping table) originally provided by the manufacturer can be downloaded on the SIM card when the SIM is activated. An advantage is that the frequency information can be updated by downloading an up-to-date mapping table from the manufacturer website as this is done for various other applications.

Table 3 provides an example of mapping between supported RAT/bands and the corresponding geographical region for two different multi-mode UEs.

TABLE 3

Example of mapping between supported bands by UE and usage in different geographical regions; table is pre-coded in UE or uploaded via an application program.

| | Multi-mode UE | | Frequency Information: supported bands in different countries/regions | |
|---|---|---|---|---|
| No | Supported RATs | Supported bands | Country/region | Geographical information of countries/regions |
| A | GSM | Band XIV (PCS 1900 MHz) | USA | Central coordinates and radius of US or multiple coordinates forming polygon |
| | WCDMA | Band I | Omnipresent except Americas | Note |
| | | Band VI | Japan | Central coordinates and radius of Japan or multiple coordinates forming polygon |
| | | Band XIV | USA | Central coordinates and radius of US or multiple coordinates forming polygon |
| B | GSM | Band XIV (PCS 1900 MHz) | North America (USA/Canada) | Central coordinates and radius of US/Canada or multiple coordinates forming polygon |
| | | Band X | Omnipresent except Americas and Japan | Note |
| | | Band XIII (DCS 1800) | Europe, Asia and Africa | Central coordinates and radius or multiple coordinates forming |

TABLE 3-continued

Example of mapping between supported bands by UE and usage in different geographical regions; table is pre-coded in UE or uploaded via an application program.

| Multi-mode UE | | Frequency Information: supported bands in different countries/regions | |
|---|---|---|---|
| Supported No RATs | Supported bands | Country/region | Geographical information of countries/regions |
| WCDMA | Band I | Omnipresent except Americas | polygon for the 3 regions Note |
| | Band IV | USA | Central coordinates and radius of US or multiple coordinates forming polygon |
| | Band IX | Japan | Central coordinates and radius of Japan or multiple coordinates forming polygon |
| LTE | Band 1 | Omnipresent except Americas | Note |
| | Band 13 | USA | Central coordinates and radius of US or multiple coordinates forming polygon |
| | Band 17 | USA | Central coordinates and radius of US or multiple coordinates forming polygon |
| | Band 6 | Japan | Central coordinates and radius of Japan or multiple coordinates forming polygon |

Note:
More appropriate to indicate coordinates of country or region where this band is not present.

In this example the mapping between frequency band and the regions where they are used is described. However, in addition to the bands more detailed information such as set of frequencies for each band or start and end of frequency numbers for each band used in different regions can also be provided.

Below the use of the regional frequency information by a UE for improving the frequency search procedure is described. Assume that UE is turned on and will have to synchronize to the network i.e. first it will try to find the most suitable frequency. Two exemplary scenarios are described where:
 the geographical location is known to UE at initial frequency search, and where
 the geographical location is unknown to UE at initial frequency search Geographical Location Known to UE Initially Assume that a UE is aware of its geographical location at the time of performing the initial frequency search. An initial frequency search is a re-synchronizing after loosing the complete network coverage or after turning on the UE receiver. This is the case when a UE has non-assisted GNSS receiver or even an assisted-GNSS receive, which can fall back to the normal (non-assisted) GNSS receiver in the absence of valid connection to the network. In either case it is also assumed that the GNSS receiver was on or at least it has recently determined its position. Thus in these scenarios the UE can also make use of regional frequency information for an initial frequency search i.e. immediately after it is powered on.

As a result, the UE will start scanning the frequencies within the bands which are used in that region as indicated by the regional frequency information i.e. the mapping table 3. The UE can also completely exclude the scanning of bands which are not used in that region. Alternatively, the UE can be configured to scan these frequencies in the background while it's already synchronized to the network and especially during the period when it is in connected mode. This is because in connected mode the band scanning will not drain additional UE battery or the impact on power consumption will be much lower compared to the case when the UE is in idle mode.

As described above a UE typically continuously searches for frequencies or scans bands even when already synchronized or connected to a network, this especially so when a UE is located in a visited network. In a visited network, during roaming, the UE generally intensifies the frequency search. Thus the UE will also use regional frequency information to prioritize the searching of bands which are used in the region where the UE is currently located. Once the UE is connected to the network then even the assisted GNSS becomes fully operational.

Thus, the UE with GNSS receiver regardless whether it is assisted or non-assisted GNSS, will easily be able to trace its geographical location. Hence the UE can fully make use of regional frequency information for prioritizing the scanning of bands or frequencies within the used bands in that region.

Geographical Location Unknown to UE Initially

If the UE has only assisted GNSS receiver, which always requires the assisted data from the network for tracking initial UE positioning information the UE cannot use the regional frequency information to improve the initial frequency search e.g. immediately after it is turned on. The UE can then rely on existing methods for initial frequency search. As described above when camping on a valid network, the UE continuously searches other frequencies within its supported bands. Therefore, the UE can still use the methods as described above to improve subsequent frequency search once its A-GNSS receiver has obtained required assisted data.

Frequency Searching by Using Signaled Information

Below two different levels of the regional frequency information that can be used by the UE for searching the frequency are described.
 Basic and typical regional frequency information
 Advanced regional frequency information The first approach can be used in large number of cases. The second approach can be used in some specific scenarios. Some exemplary use cases are described below.

Basic and Typical Signaled Information

In one embodiment the network signals the regional frequency information to the UE by using one or more of the relevant triggering mechanisms described above.

Table 4 gives an example of the signaled information to a specific UE (UE A in this example).

TABLE 4

Example of mapping between supported bands by UE and usage in different geographical regions; complete UE specific table is signaled to a particular UE (UE-A).

| Multi-mode UE | | Frequency Information: supported bands in different countries/regions | |
| --- | --- | --- | --- |
| Supported No RATs | Supported bands | Country/region | Geographical information of countries/regions |
| A GSM | Band XIV (PCS 1900 MHz) | North America (USA/Canada) | Central coordinates and radius of US/Canada or multiple coordinates forming polygon |
| WCDMA | Band I | Omnipresent except Americas | Note |
| | Band VI | Japan | Central coordinates and radius of Japan or multiple coordinates forming polygon |
| | Band XIV | USA | Central coordinates and radius of US or multiple coordinates forming polygon |

Note:
More appropriate to indicate coordinates of country or region where this band is not present.

As shown in the table the UE is provided the frequency information of all RAT:s and bands supported by this UE. This can be done at the time of registration and can be updated later when there is a change. Depending upon whether the initial location is known or not to the UE, the UE can use the signaled table for improving frequency searching according to the principles described above.

Table 5 gives an example of signaled information to a specific UE (UE B in this example) traveling to the US. As shown in the table the frequency information related to all RAT:s and bands supported by this UE is provided to it prior to the subscriber's departure for instance after checking in. It is assumed that the network is aware of the subscriber travel itinerary or travel history as described above.

As shown in table 5 the frequency information related to the country of destination, which is US in this example, is provided to the UE. In addition the network can provide the frequency information of all transit countries and regions which are or likely to be encountered by the traveler on the way to his final destination. Alternatively the network can provide the complete and comprehensive frequency information to the UE of all countries and regions in this world. This information can be complementarily sent to the UE at the time of the subscriber's departure even if the normal signaled frequency information mechanisms are in use. Hereby it is ensured that the UE has the latest frequency information applicable in the destination and transit countries prior to its arrival there. Then depending whether the initial location is known or unknown to the UE, the signaled table can be used by the UE for improving the frequency search process according to the principles described above.

TABLE 5

Example of mapping between supported bands by UE and usage in different geographical regions; UE specific table is signaled to UE (UE-B) traveling to US based on flight information.

| Multi-mode UE | | Frequency Information: supported bands in different countries/regions | |
| --- | --- | --- | --- |
| Supported No RATs | Supported bands | Country/region | Geographical information of countries/regions |
| B GSM | Band XIV (PCS 1900 MHz) | North America (USA/Canada) | Central coordinates and radius of US/Canada or multiple coordinates forming polygon |
| WCDMA | Band I | Omnipresent except Americas | Note |
| | Band IV | USA | Central coordinates and radius of US or multiple coordinates forming polygon |
| LTE | Band 1 | Omnipresent except Americas | Note |
| | Band 13 | USA | Central coordinates and radius of US or multiple coordinates forming polygon |
| | Band 17 | USA | Central coordinates and radius of US or multiple coordinates forming polygon |

Note:
More appropriate to indicate coordinates of country or region where this band is not present.

Advanced Regional Frequency Information

As described above, the subscriber itinerary information can also be used by the network to signal the RATs/bands used on various flight connections. However in this case the regional frequency information may differ compared to those used for normal cases i.e. for the ground network. Since flights may traverse several regions or countries or even continents therefore it is typically not appropriate to provide the geographical coordinates of the RATs/bands used on the flight intended to be boarded by the subscriber.

Instead, flight frequency information can be signaled and it may comprise of RATs/bands used for certain duration of time i.e. during the flight. The start and end time of the duration over which the on the board RATs/bands are used can also be provided. Furthermore the information for each connection can be provided either at the start of the first flight or at the start of each connecting flight. As a consequence during the flight the UE will only search for the RATs/bands active during the flight.

The UE can also be provided with additional criteria or conditions which should be fulfilled before starting the scanning of the required bands. Such criteria may be elevation/altitude and the flight cabin pressure in addition to the start and end times of the flight. The reason for providing these additional criteria is because on board service will be used after take off and before landing i.e. when the aircraft is flying at a certain altitude and cabin pressure is lower compared to that on the ground. Thus, the UE may search only the RATs/bands available during the flight when the estimated elevation/altitude during the flight reaches above the threshold signaled to the UE e.g. 500 meters. For regulation purposes the same criteria of altitude/elevation may also be used to completely turn off the UE transmitter and receiver during the takeoff and landing phases. This means UE will not transmit any signal or search for any frequency unless the altitude/elevation is above certain threshold e.g. 500 meters. This will save UE battery.

A normal GPS or A-GPS receiver can also estimate the elevation/altitude may involve large error in case fewer satellites are visible. The pressure, which decreases with the increase in the altitude, can in turn be estimated by using a mapping table between the altitude and the pressure. However more accurate evaluation of these additional criteria may, however, require that UE has dedicated sensors, to measure parameters such as elevation and pressure.

In another scenario in which on the flight mobile communication is not supported on a particular flight the same principles can be applied. In such a scenario, the UE can be adapted to not search for any frequency during the flight. For example, a UE may be mistakenly or deliberately for some other purpose may remain on during the flight. In such a scenario, UE will regularly search for possible frequencies/RAT but all in vain since there is no on the board network. During longer flight this could considerably drain the UE battery. To prevent this from happening, the UE can be provided with information such as elevation/altitude of the flight and the flight cabin pressure in addition to the start and end times of the flight. The UE can use a GPS receiver to measure its altitude, which in turn can be used to determine when the UE should not search for a particular frequency.

Flight frequency information can be signaled to the UE either by the home network, in response to a subscriber travel plan. This information can also be provided to the UE by a network on board.

In another scenario the UE may be traveling at a high speed. For example a mobile subscriber traveling in high speed train can be served by a dedicated or specific network, which is different than the one used for normal operation. Thus, typically different set of frequencies or even band and certain limited RATs may be used by an operator for serving high speed mobile subscribers. For instance in case of GSM the GSM band XI (Railways GSM 900 Band) is solely standardized for use in railways. Furthermore, such base stations should be capable of adjusting the Doppler frequency of the carriers by the virtue of automatic frequency correction (AFC) method. Due to additional complexity of implementing AFC, a normal base station will typically not be able to serve a subscriber traveling at a speed beyond its frequency adjustment capability. Although networks offering services at higher UE speeds require specific implementation nonetheless such networks supporting UE speed up to 350 km/hr are becoming common around the world. Typically, a high speed train runs at higher speed for considerable time without interruption. However, when the train slows down for instance when approaching a station or while passing through a metropolitan area, the subscriber can be served by the normal base station. Thus, in accordance with one embodiment, when the UE speed is above certain threshold the UE should only search or search with higher priority those additional frequencies, bands and RATs, which are specifically used for the high speed train scenario. In accordance with one embodiment the UE is camped on to the serving frequency in order to detect the speed. The UE can be adapted to continue to scan the supported bands even when it is camped on to a frequency.

The signaled information can comprise of threshold in terms of user speed, Doppler frequency or rate of cell change etc, in addition to information such as frequencies, bands and RAT used in a particular high speed train scenario experienced by the subscriber. This can be termed high speed frequency information which contains speed thresholds, frequencies/RAT/bands and if necessary the time duration including start and end times. When the UE speed is above the signaled threshold then the UE will search or prioritize the searching of frequencies used in the high speed scenario. As in other described embodiments, the network can provide such information to the UE by knowing the subscriber travel itinerary.

The network may also use other means to provide high speed frequency information to UE in case it does not have subscriber travel itinerary information. In one embodiment high speed frequency information is signaled from the network supporting high speed operation e.g. railway mobile network. Yet another possibility is that such a network signals this information only to those UEs whose speed increases above certain threshold. Several existing methods for measuring the UE speed exist. They allow measuring of the UE speed either at the UE itself or at the network. For instance according to some methods, the UE speed can be measured by estimating the Doppler frequency or fading rate of the received signal.

Prioritization of Carrier Frequencies Based on Radio Requirements

In such an embodiment the UE can prioritize the carrier frequencies for searching based on the pre-defined radio requirements or the network signaled information related to the radio requirements. The same carrier frequency or band may have different level of radio requirements depending upon the region and also on the type of radio access technology. For instance loose requirements for certain technology in a certain band may lead to larger loss in performance and vice versa. Hence, the UE can prioritize the carrier frequency and the corresponding radio access technology for searching which are associated with the most stringent requirements.

In yet another embodiment the UE can prioritize the searching of carrier frequencies based on the geographical location, regional frequency information and the radio requirements associated with the frequency bands and radio access technologies indicated in the regional frequency information. Hence, UE can prioritize the carrier frequency and the corresponding radio access technology for searching indicated in the regional frequency information as well as which are associated with the most stringent requirements.

Subscriber Travel Information: Mobile Information Services

Presently mobile phone is being increasingly used for providing various types of information to the subscriber such as flight or train schedules as described below.

Flight Information Via SMS

Most airlines allow travelers the possibility of receiving their flight schedule via short message service (SMS). Similarly subscribers have the possibility of checking in or changing their flight schedule by using their mobile phone e.g. by sending SMS. This means the subscriber's mobile operator can be aware of subscriber's travel itinerary. This is very vital information in terms of roaming. For instance this can enable operator to provide the subscriber prior to its departure the latest frequency information (e.g. frequency bands) of its roaming partners in the region or a country where the subscriber is travelling. When in the visited country the mobile terminal can thus focus on searching or prioritizing the searching of the indicated bands and RATs or even sub-set of carriers frequencies within the indicated bands and RAT.

Terrestrial Travel Information

Terrestrial travel can be by bus or by train or by any land route which involves some travel agency or an organization, which in turn uses some sort of mobile service such as SMS for booking and cancelling journeys or for informing schedule etc to their customers. Since mobile operator is involved therefore the operator can extract the subscriber itinerary plan and use it for configuring the UE with the relevant frequencies/RAT deployed in the region where the subscriber aims to travel.

Sea Travel Information

Organized sea travel also involves agencies, which may be using mobile network for services such as booking the customers' travel plan and for informing them the schedules. As the mobile operator can be aware of the sea travel plan of its subscriber using the mobile service, it can therefore inform the subscriber about the relevant frequency/RAT information applicable at the destination.

Subscriber Travel History

Subscriber travel history can be tracked by the mobile operator by observing the subscriber's mobility behavior, which in turn can be depicted by information such as registration to the Visitor Location Register (VLR), location or tracking area updates or the use of A-GPS service.

The subscriber travel history information of the frequent travelers and of the crew or staff members working for boats, airlines, long distance bus service and railway could be particularly advantageous for the mobile operator. Based on the knowledge the mobile operator can provide the most relevant and latest frequency information to the frequent travelers and to the crew members.

Dedicated or Standalone Mobile Network

In some scenarios mobile operator typically deploys dedicated network, which is accustomed to work in these specific scenarios. In some cases specific frequencies or even frequency band may be used in these scenarios.

One example is that of the railway network, which should be able to serve the UE at significantly higher speed beyond 300 km/hr. The base stations deployed in this network require additional functionalities such as automatic frequency correction due to very higher Doppler frequency at higher UE speed. Note that all UE are compliant to work under high speed train scenario since UE requirements are mandatory and as they could be roaming between the networks supporting high speed and the normal operations. But base station requirements for the high speed train requirements are optional. GSM band XI (Railways GSM) is exclusively used for railways but this band also includes the standard 900 MHz GSM band. For instance this band has favorable propagation conditions leading to relatively lower Doppler frequency at higher speed and thus causing less performance degradation. Similarly dedicated mobile networks for use in the aircrafts are being under test. A mobile operator will typically use sub-set of frequencies and RAT and also most likely those bands, which are suitable in aircraft radio environment, which is characterized by high signal scattering.

Some operators are also deploying dedicated mobile networks in boats and ships operating in deep sea and on overseas routes. These dedicated base stations deployed in the ships are connected to the normal terrestrial network via the satellite stations. It is also likely that specific bands, frequencies or even RAT are used in the ship.

Using the method and system as described herein will improve the frequency search or band scanning process. The frequency search delay is reduced; which allows a UE to relatively quickly camp on to the best possible cell. Also, the UE power consumption is reduced since UE only scans bands or searches frequencies, which are used in the region or country where subscriber is physically present.

In addition an advantage in terms of overall reduction in power consumption and in frequency search delay when subscriber is in visited network is achieved. There is also an advantage in terms of overall reduction in power consumption and in frequency search delay in partial deployment scenarios. There is similar benefits during the initial deployment phase of frequency bands/RAT:s, which typically expands gradually. For instance certain bands/RAT:s supported by the UE may not be fully operational in the entire country or region. Moreover, the complexity of multi-mode can be reduced since UE does not have to be designed for the worst case rather for typical deployment scenario. In the worst case such a UE is expected to continuously search all the bands and RATs it supports.

The invention claimed is:

1. A method for use in a User Equipment for searching channels in one or more frequency bands, wherein the method of searching channels comprises the steps of:
   determining a present geographical location of the User Equipment;
   receiving periodic or event-triggered regional frequency information comprising at least frequency bands in different geographical regions;
   determining prioritized frequency bands from the determined geographical location and the geographical regional frequency information; and
   prioritizing searching of channels belonging to the determined prioritized frequency bands based on the determined prioritized frequency bands and on radio requirements associated with the determined prioritized frequency bands, wherein channels having the most stringent radio requirements are searched with the highest priority.

2. The method according to claim 1, wherein the received regional frequency information comprises one or more of the following additional parameters indicating a range of values over which the received regional frequency information is valid:
   start time and duration;
   start time and end time;
   elevation or air pressure;
   Doppler frequency or User Equipment speed; and
   rate of handovers or cell reselections.

3. The method according to claim 1, wherein the regional frequency information comprises a set of radio access technology used at the determined geographical location of the User Equipment.

4. The method according to claim 1, wherein the regional frequency information comprises a set of channels or carrier frequencies used at the determined geographical location of the User Equipment.

5. The method according to claim 1, wherein the regional frequency information is received in response to information related to travel itinerary or travel history of the User Equipment.

6. The method according to claim 5, wherein the travel itinerary of the User Equipment is determined by a mobile information service.

7. The method according to claim 5, wherein the travel itinerary of the User Equipment is determined from coordinates obtained from a Global navigational positioning system or an assisted Global navigational positioning system, wherein the coordinates are coordinates of a route and a destination intended to be followed by the User Equipment.

8. The method according to claim 5, wherein the travel history of the User Equipment is determined from statistics of an area update performed by the User Equipment over a period of time.

9. The method according to claim 8, wherein the area update comprises one or more of: location area update, tracking area update, and registration area.

10. The method according to claim 1, wherein some regional frequency information is pre-coded in a memory of the User Equipment.

11. The method according to claim 10, wherein the pre-coded regional frequency information is updated by regional frequency information received over an air interface.

12. The method according to claim 10, wherein the pre-coded information is stored in a Subscriber Identity Module or a Universal Subscriber identity Module of the User Equipment.

13. The method according to claim 10, wherein the regional frequency information is pre-coded in the User Equipment via an application program.

14. The method according to claim 10, wherein the regional frequency information is pre-coded in the User Equipment by a mobile operator.

15. The method according to claim 1, wherein the regional frequency information comprises frequency bands used in a region and geographical information of the region.

16. The method according to claim 15, wherein the geographical information of the region comprises country or regional codes.

17. The method according to claim 15, wherein the geographical information of the region comprises country or regional Global navigational positioning system coordinates, including a set of central Global navigational positioning system coordinates or multiple Global navigational positioning system coordinates forming a region.

18. The method according to claim 1, wherein the geographical location is determined using a Global navigational positioning system or an assisted Global navigational positioning system receiver.

19. A User Equipment adapted to search channels in one or more frequency bands, wherein the User Equipment is configured to perform the following:
   determine a present geographical location of the User Equipment;
   receive periodic or event-triggered regional frequency information comprising at least frequency bands in different geographical regions;
   determine prioritized frequency bands from the determined geographical location and the geographical regional frequency information; and
   prioritize searching of carrier frequencies belonging to the determined prioritized frequency bands based on the determined prioritized frequency bands and on radio requirements associated with the determined prioritized frequency bands, wherein channels having the most stringent radio requirements are searched with the highest priority.

20. The User Equipment according to claim 19, wherein the received regional frequency information comprises one or more of the following additional parameters indicating a range of values over which the received regional frequency information is valid:
   start time and duration;
   start time and end time;
   elevation or air pressure;
   Doppler frequency or User Equipment speed; and
   rate of handovers or cell reselections.

21. The User Equipment according to claim 19, wherein the regional frequency information comprises a set of radio access technology used at the location of the User Equipment.

22. The User Equipment according to claim 19, wherein the regional frequency information comprises a set of channels or carrier frequencies used at the location of the User Equipment.

23. The User Equipment according to claim 19, wherein the User Equipment is adapted to receive the regional frequency information in response to information related to travel itinerary or travel history of the User Equipment.

24. The User Equipment according to claim 23, wherein the User Equipment is further configured to transmit the travel itinerary using a mobile information service.

25. The User Equipment according to claim 23, wherein the User Equipment is further configured to determine the travel itinerary using coordinates obtained from a Global navigational positioning system or an assisted Global navigational positioning system.

26. The User Equipment according to claim 23, wherein the User Equipment is further configured to determine the travel history of the User Equipment from statistics of an area update performed by the User Equipment over a period of time.

27. The User Equipment according to claim 26, wherein the area update is one or more of: location area update, tracking area update, and registration area.

28. The User Equipment according to claim 19, wherein the User Equipment is further configured to store some pre-coded regional frequency information.

29. The User Equipment according to claim 28, wherein the User Equipment is further configured to update the pre-coded regional frequency information with regional frequency information received over an air interface.

30. The User Equipment according to claim 28, wherein the User Equipment is configured to store the pre-coded regional frequency information in a Subscriber Identity Module or a Universal Subscriber identity Module of the User Equipment.

31. The User Equipment according to claim 19, wherein the regional frequency information comprises frequency bands used in a region and geographical information of the region.

32. The User Equipment according to claim 31, wherein the geographical information of the region comprises country or regional codes.

33. The User Equipment according to claim 31, wherein the geographical information of the region comprises country or regional Global navigational positioning system coordinates, including a set of central Global navigational positioning system coordinates or multiple Global navigational positioning system coordinates forming a region.

34. The User Equipment according to claim 19, wherein the User Equipment is further configured to determine the geographical location using a Global navigational positioning system or an assisted Global navigational positioning system receiver.

35. A method of transmitting regional frequency information from a network node for use in a cellular radio network, wherein the regional frequency information is signaled to a User Equipment connected to the cellular radio network, the method comprising:
   receiving a current subscriber location from the User Equipment;
   receiving subscriber travel information or travel historical data associated with the User Equipment from the network; and
   signaling the regional frequency information to the User Equipment based on the current subscriber location received from the User Equipment, and the subscriber travel information or travel historical data associated with the User Equipment received from the network.

* * * * *

UNITED STATES PATENT AND TRADEMARK OFFICE
CERTIFICATE OF CORRECTION

PATENT NO. : 8,923,857 B2
APPLICATION NO. : 13/265069
DATED : December 30, 2014
INVENTOR(S) : Kazmi Page 1 of 1

It is certified that error appears in the above-identified patent and that said Letters Patent is hereby corrected as shown below:

On the title page, item (73), under "Assignee", in Column 1, Line 2, delete "(publ) (SE)" and insert -- (publ), Stockholm (SE) --, therefor.

In the Specification

In Column 5, Line 67, delete "LTE E" and insert -- LTE --, therefor.

In Column 7, Line 60, delete "LIE" and insert -- LTE --, therefor.

In Column 8, Line 32, delete "ration" and insert -- ratio --, therefor.

In Column 9, Line 13, delete "(MEQ)" and insert -- (MEO) --, therefor.

Signed and Sealed this
Seventh Day of July, 2015

Michelle K. Lee
*Director of the United States Patent and Trademark Office*